United States Patent
Li et al.

(10) Patent No.: US 11,100,311 B2
(45) Date of Patent: *Aug. 24, 2021

(54) NEURAL NETWORKS FOR FACIAL MODELING

(71) Applicant: Snap Inc., Santa Monica, CA (US)

(72) Inventors: Jia Li, Marina Del Rey, CA (US); Xutao Lv, Marina Del Rey, CA (US); Xiaoyu Wang, Playa Vista, CA (US); Xuehan Xiong, Los Angeles, CA (US); Jianchao Yang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/509,083

(22) Filed: Jul. 11, 2019

(65) Prior Publication Data
US 2019/0332852 A1  Oct. 31, 2019

Related U.S. Application Data

(63) Continuation of application No. 16/226,084, filed on Dec. 19, 2018, now Pat. No. 10,395,100, which is a (Continued)

(51) Int. Cl.
*G06K 9/00* (2006.01)
*G06T 7/11* (2017.01)
*G06K 9/62* (2006.01)

(52) U.S. Cl.
CPC ..... *G06K 9/00288* (2013.01); *G06K 9/00268* (2013.01); *G06K 9/00281* (2013.01);
(Continued)

(58) Field of Classification Search
CPC .......... G06K 9/00288; G06K 9/00281; G06K 9/00268; G06K 9/00228; G06K 9/00221;
(Continued)

(56) References Cited

U.S. PATENT DOCUMENTS 5,880,731 A 3/1999 Liles et al.
5,995,639 A 11/1999 Kado et al.
(Continued)

FOREIGN PATENT DOCUMENTS

CA 2887596 A1 7/2015
CN 109844761 A 6/2019
(Continued)

OTHER PUBLICATIONS

U.S. Appl. No. 15/297,789 U.S. Pat. No. 10,198,626, filed Oct. 19, 2016, Neural Networks for Facial Modeling.
(Continued)

*Primary Examiner* — Michael S Osinski
(74) *Attorney, Agent, or Firm* — Schwegman Lundberg & Woessner, P.A.

(57) ABSTRACT

Systems, devices, media, and methods are presented for modeling facial representations using image segmentation with a client device. The systems and methods receive an image depicting a face, detect at least a portion of the face within the image, and identify a set of facial features within the portion of the face. The systems and methods generate a descriptor function representing the set of facial features, fit object functions of the descriptor function, identify an identification probability for each facial feature, and assign an identification to each facial feature.

20 Claims, 11 Drawing Sheets

Related U.S. Application Data continuation of application No. 15/297,789, filed on Oct. 19, 2016, now Pat. No. 10,198,626.

(52) U.S. Cl.
CPC ............ G06K 9/627 (2013.01); G06T 7/11 (2017.01); *G06K 2009/00322* (2013.01); *G06T 2207/20076* (2013.01); *G06T 2207/20112* (2013.01)

(58) Field of Classification Search
CPC ......... G06K 9/00248; G06K 9/00677; G06K 9/00295; G06K 9/6269; G06K 9/627; G06K 9/6272; G06K 9/6202; G06K 2009/00322; G06T 7/11; G06T 2207/30201; G06T 2207/20112; G06T 2207/20076; G06N 3/02
See application file for complete search history.

(56) References Cited

U.S. PATENT DOCUMENTS

| | | | |
|---|---|---|---|
| 6,023,270 A | 2/2000 | Brush, II et al. | |
| 6,038,295 A | 3/2000 | Mattes | |
| 6,223,165 B1 | 4/2001 | Lauffer | |
| 6,252,678 B1* | 6/2001 | Shimizu | H04N 1/40087 347/184 |
| 6,772,195 B1 | 8/2004 | Hatlelid et al. | |
| 6,842,779 B1 | 1/2005 | Nishizawa | |
| 6,980,909 B2 | 12/2005 | Root et al. | |
| 7,173,651 B1 | 2/2007 | Knowles | |
| 7,342,587 B2 | 3/2008 | Danzig et al. | |
| 7,411,493 B2 | 8/2008 | Smith | |
| 7,468,729 B1 | 12/2008 | Levinson | |
| 7,535,890 B2 | 5/2009 | Rojas | |
| 7,596,247 B2 | 9/2009 | Ioffe | |
| 7,636,755 B2 | 12/2009 | Blattner et al. | |
| 7,639,251 B2 | 12/2009 | Gu et al. | |
| 7,676,089 B2* | 3/2010 | Nishida | G06K 9/00463 382/176 |
| 7,775,885 B2 | 8/2010 | Van Luchene et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 7,961,986 B1 | 6/2011 | Jing et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,131,597 B2 | 3/2012 | Hudetz | |
| 8,146,005 B2 | 3/2012 | Jones et al. | |
| 8,151,191 B2 | 4/2012 | Nicol | |
| 8,199,747 B2 | 6/2012 | Rojas et al. | |
| 8,332,475 B2 | 12/2012 | Rosen et al. | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,438,163 B1* | 5/2013 | Li | G06K 9/00536 707/737 |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,582,807 B2 | 11/2013 | Yang et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,718,333 B2 | 5/2014 | Wolf et al. | |
| 8,724,622 B2 | 5/2014 | Rojas | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,874,677 B2 | 10/2014 | Rosen et al. | |
| 8,890,926 B2 | 11/2014 | Tandon et al. | |
| 8,892,999 B2 | 11/2014 | Nims et al. | |
| 8,909,679 B2 | 12/2014 | Root et al. | |
| 8,924,250 B2 | 12/2014 | Bates et al. | |
| 8,963,926 B2 | 2/2015 | Brown et al. | |
| 8,977,003 B1 | 3/2015 | Kwan et al. | |
| 8,989,786 B2 | 3/2015 | Feghali | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,086,776 B2 | 7/2015 | Ye et al. | |
| 9,100,806 B2 | 8/2015 | Rosen et al. | |
| 9,100,807 B2 | 8/2015 | Rosen et al. | |
| 9,105,014 B2 | 8/2015 | Collet et al. | |
| 9,158,970 B2 | 10/2015 | Zhang et al. | |
| 9,191,776 B2 | 11/2015 | Root et al. | |
| 9,204,252 B2 | 12/2015 | Root | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,430,697 B1 | 8/2016 | Iliadis et al. | |
| 9,443,227 B2 | 9/2016 | Evans et al. | |
| 9,460,541 B2 | 10/2016 | Li et al. | |
| 9,489,661 B2 | 11/2016 | Evans et al. | |
| 9,489,760 B2 | 11/2016 | Li et al. | |
| 9,491,134 B2 | 11/2016 | Rosen et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,639,742 B2 | 5/2017 | Lee et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,858,496 B2 | 1/2018 | Sun et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,198,624 B2* | 2/2019 | Li | G06K 9/00 |
| 10,198,626 B2 | 2/2019 | Li et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |

(56) References Cited

U.S. PATENT DOCUMENTS

| | | | |
|---|---|---|---|
| 10,345,440 B1* | 7/2019 | West | G01S 13/9029 |
| 10,362,219 B2 | 7/2019 | Wilson et al. | |
| 10,395,100 B1 | 8/2019 | Li et al. | |
| 10,475,225 B2 | 11/2019 | Park et al. | |
| 10,504,266 B2 | 12/2019 | Blattner et al. | |
| 10,534,949 B1* | 1/2020 | Anderton | G06K 7/1417 |
| 10,573,048 B2 | 2/2020 | Ni et al. | |
| 10,657,701 B2 | 5/2020 | Osman et al. | |
| 2002/0067362 A1 | 6/2002 | Agostino Nocera et al. | |
| 2002/0122596 A1 | 9/2002 | Bradshaw | |
| 2002/0169644 A1 | 11/2002 | Greene | |
| 2004/0264780 A1 | 12/2004 | Zhang et al. | |
| 2005/0058345 A1* | 3/2005 | Koide | G06T 7/11 382/173 |
| 2005/0105780 A1 | 5/2005 | Ioffe | |
| 2005/0162419 A1 | 7/2005 | Kim et al. | |
| 2005/0198661 A1 | 9/2005 | Collins et al. | |
| 2005/0206610 A1 | 9/2005 | Cordelli | |
| 2006/0008140 A1* | 1/2006 | Imamura | G06K 9/4652 382/164 |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0066798 A1* | 3/2009 | Oku | H04N 5/23293 348/207.99 |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0185723 A1 | 7/2009 | Kurtz et al. | |
| 2009/0196467 A1 | 8/2009 | Okubo | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0202697 A1 | 8/2010 | Matsuzaka et al. | |
| 2010/0203968 A1 | 8/2010 | Gill et al. | |
| 2010/0227682 A1 | 9/2010 | Reville et al. | |
| 2011/0026771 A1* | 2/2011 | Hsu | G06K 9/00805 382/104 |
| 2011/0093780 A1 | 4/2011 | Dunn | |
| 2011/0110590 A1* | 5/2011 | Suzuki | H04N 1/54 382/173 |
| 2011/0115798 A1 | 5/2011 | Nayar et al. | |
| 2011/0148864 A1 | 6/2011 | Lee et al. | |
| 2011/0202598 A1 | 8/2011 | Evans et al. | |
| 2011/0206283 A1* | 8/2011 | Quarfordt | G06K 9/0061 382/220 |
| 2011/0239136 A1 | 9/2011 | Goldman et al. | |
| 2011/0293189 A1 | 12/2011 | Sun et al. | |
| 2012/0054691 A1 | 3/2012 | Nurmi | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2012/0209924 A1 | 8/2012 | Evans et al. | |
| 2012/0230545 A1 | 9/2012 | Zhang et al. | |
| 2013/0015946 A1 | 1/2013 | Lau et al. | |
| 2013/0070973 A1 | 3/2013 | Saito et al. | |
| 2013/0103760 A1 | 4/2013 | Golding et al. | |
| 2013/0121584 A1 | 5/2013 | Bourdev et al. | |
| 2013/0201187 A1 | 8/2013 | Tong et al. | |
| 2013/0216094 A1* | 8/2013 | DeLean | G06K 9/00335 382/103 |
| 2013/0249948 A1 | 9/2013 | Reitan | |
| 2013/0257877 A1 | 10/2013 | Davis | |
| 2014/0010459 A1* | 1/2014 | Sumi | G06K 9/00221 382/195 |
| 2014/0037167 A1* | 2/2014 | Shirahata | A61B 6/466 382/128 |
| 2014/0043329 A1 | 2/2014 | Wang et al. | |
| 2014/0055554 A1 | 2/2014 | Du et al. | |
| 2014/0125678 A1 | 5/2014 | Wang et al. | |
| 2014/0129343 A1 | 5/2014 | Finster et al. | |
| 2014/0140625 A1 | 5/2014 | Zhang et al. | |
| 2014/0270365 A1* | 9/2014 | Mostafavi | G06T 7/194 382/103 |
| 2014/0341422 A1 | 11/2014 | Xiong et al. | |
| 2015/0033362 A1 | 1/2015 | Mau et al. | |
| 2015/0086087 A1 | 3/2015 | Ricanek, Jr. et al. | |
| 2015/0089028 A1* | 3/2015 | Zheng | H04L 67/06 709/219 |
| 2015/0123967 A1 | 5/2015 | Quinn et al. | |
| 2015/0125049 A1 | 5/2015 | Taigman et al. | |
| 2015/0139492 A1 | 5/2015 | Murakami et al. | |
| 2015/0169938 A1 | 6/2015 | Yao et al. | |
| 2015/0206349 A1 | 7/2015 | Rosenthal et al. | |
| 2015/0234942 A1 | 8/2015 | Harmon | |
| 2015/0269421 A1 | 9/2015 | Liu et al. | |
| 2015/0310261 A1 | 10/2015 | Lee et al. | |
| 2015/0317511 A1 | 11/2015 | Li et al. | |
| 2016/0070956 A1 | 3/2016 | Lu et al. | |
| 2016/0086016 A1* | 3/2016 | Suh | G06K 9/00248 382/118 |
| 2016/0086020 A1 | 3/2016 | Bigos et al. | |
| 2016/0132718 A1 | 5/2016 | Park et al. | |
| 2016/0134840 A1 | 5/2016 | Mcculloch | |
| 2016/0148041 A1* | 5/2016 | Kim | G06K 9/00228 382/118 |
| 2016/0234149 A1 | 8/2016 | Tsuda et al. | |
| 2016/0253817 A1* | 9/2016 | Chen | G06K 9/0014 382/133 |
| 2016/0267331 A1* | 9/2016 | Pillai | G06K 9/00805 |
| 2016/0292494 A1 | 10/2016 | Ganong et al. | |
| 2016/0328630 A1* | 11/2016 | Han | G06K 9/6272 |
| 2017/0061252 A1 | 3/2017 | Burgos et al. | |
| 2017/0080346 A1 | 3/2017 | Abbas | |
| 2017/0083752 A1* | 3/2017 | Saberian | G06N 3/0454 |
| 2017/0087473 A1 | 3/2017 | Siegel et al. | |
| 2017/0098124 A1 | 4/2017 | Jonsson et al. | |
| 2017/0113140 A1 | 4/2017 | Blackstock et al. | |
| 2017/0118145 A1 | 4/2017 | Aittoniemi et al. | |
| 2017/0180604 A1* | 6/2017 | Miyadera | H04N 1/4056 |
| 2017/0199855 A1 | 7/2017 | Fishbeck | |
| 2017/0235848 A1 | 8/2017 | Van Dusen et al. | |
| 2017/0262695 A1 | 9/2017 | Ahmed | |
| 2017/0286752 A1 | 10/2017 | Gusarov et al. | |
| 2017/0310934 A1 | 10/2017 | Du et al. | |
| 2017/0312634 A1 | 11/2017 | Ledoux et al. | |
| 2017/0364750 A1 | 12/2017 | Tan | |
| 2018/0012092 A1 | 1/2018 | Gleeson-may et al. | |
| 2018/0025079 A1* | 1/2018 | Xiao | G06F 16/739 707/722 |
| 2018/0047200 A1 | 2/2018 | O'hara et al. | |
| 2018/0075291 A1 | 3/2018 | Tian et al. | |
| 2018/0096457 A1 | 4/2018 | Savvides et al. | |
| 2018/0107866 A1 | 4/2018 | Li et al. | |
| 2018/0113587 A1 | 4/2018 | Allen et al. | |
| 2018/0115503 A1 | 4/2018 | Baldwin et al. | |
| 2018/0137344 A1 | 5/2018 | Kusakabe | |
| 2018/0137388 A1* | 5/2018 | Kim | G06K 9/623 |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2019/0001223 A1 | 1/2019 | Blackstock et al. | |
| 2019/0057616 A1 | 2/2019 | Cohen et al. | |
| 2019/0139256 A1* | 5/2019 | Kim | H04N 5/23229 |
| 2019/0188920 A1 | 6/2019 | Mcphee et al. | |

(56) References Cited

U.S. PATENT DOCUMENTS

2019/0325638 A1* 10/2019 Lucas .................. G06T 15/30
2020/0089985 A1* 3/2020 Wang .................. G06K 9/325

FOREIGN PATENT DOCUMENTS

| | | |
|---|---|---|
| CN | 109863532 A | 6/2019 |
| CN | 110168478 A | 8/2019 |
| EP | 2184092 A2 | 5/2010 |
| JP | 2001230801 A | 8/2001 |
| JP | 5497931 B2 | 3/2014 |
| KR | 101198322 | 11/2012 |
| KR | 20130121202 | 11/2013 |
| KR | 101445263 B1 | 9/2014 |
| KR | 20160061856 | 6/2016 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | 2016026063 | 2/2016 |
| WO | WO-2016090605 A1 | 6/2016 |
| WO | WO-2016145379 A1 | 9/2016 |
| WO | WO-2018075800 A1 | 4/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

U.S. Appl. No. 16/226,084, filed Dec. 19, 2018, Neural Networks for Facial Modeling.
"European Application Serial No. 17863119.8, Extended European Search Report dated Sep. 11, 2019", 8 pgs.
Mu, Li, "Deep Identity-aware Transfer of Facial Attributes", arXiv:1610.05586v1, (Oct. 18, 2016), 13 pgs.
Ozbulak, Gokhan, "How Transferable Are CNN-Based Features for Age and Gender Classification?", International Conference of the Biometrics Special Interest Group (BIOSIG), Gesellschaft Fuer Informatik, (Sep. 21, 2016), 6 pgs.
"U.S. Appl. No. 15/297,789, Final Office Action dated Sep. 21, 2018", 14 pgs.
"U.S. Appl. No. 15/297,789, Non Final Office Action dated Feb. 14, 2018", 16 pgs.
"U.S. Appl. No. 15/297,789, Notice of Allowance dated Oct. 25, 2018", 12 pgs.
"U.S. Appl. No. 15/297,789, Response filed Aug. 14, 2018 to Non Final Office Action dated Feb. 14, 2018", 17 pgs.
"U.S. Appl. No. 15/297,789, Response filed Oct. 11, 2018 toFinal Office Action dated Sep. 21, 2018", 11 pgs.
"U.S. Appl. No. 16/226,084, Non Final Office Action dated Jan. 31, 2019", 12 pgs.
"U.S. Appl. No. 16/226,084, Notice of Allowance dated Apr. 19, 2019", 9 pgs.
"U.S. Appl. No. 16/226,084, Response filed Apr. 3, 2019 to Non Final Office Action dated Jan. 31, 2019", 2 pgs.
"International Application Serial No. PCT/US2017/057445, International Preliminary Report on Patentability dated May 2, 2019", 9 pgs.
"International Application Serial No. PCT/US2017/057445, International Search Report dated Jan. 18, 2018", 3 pgs.
"International Application Serial No. PCT/US2017/057445, Written Opinion dated Jan. 18, 2018", 7 pgs.
Leyden, John, "This SMS will self-destruct in 40 seconds", [Online] Retrieved from the internet: <URL: http://www.theregister.co.uk/2005/12/12/stealthtext/>, (Dec. 12, 2005), 1 pg.
"European Application Serial No. 17863119.8, Response filed Mar. 19, 2020 to Extended European Search Report dated Sep. 11, 2019", 26 pgs.
"Korean Application Serial No. 10-2019-7014288, Notice of Preliminary Rejection dated May 25, 2020", w/ English Translation, 15 pgs.
"Korean Application Serial No. 10-2019-7014288, Response filed Jul. 14, 2020 to Notice of Preliminary Rejection dated May 25, 2020", w/ English Claims, 23 pgs.
"Korean Application Serial No. 10-2021-7006111, Notice of Preliminary Rejection dated May 21, 2021", w/ English Translation, 17 pgs.

* cited by examiner

NEURAL NETWORKS FOR FACIAL MODELING

PRIORITY

This application is a continuation of and claims the benefit of priority of U.S. patent application Ser. No. 16/226,084, filed on Dec. 19, 2018, which is a continuation of and claims the benefit of priority of U.S. patent application Ser. No. 15/297,789, filed on Oct. 19, 2016, which are hereby incorporated by reference herein in their entirety

TECHNICAL FIELD

Embodiments of the present disclosure relate generally to automated processing of images. More particularly, but not by way of limitation, the present disclosure addresses systems and methods for modeling representations of a face depicted within a set of images.

BACKGROUND

Telecommunications applications and devices can provide communication between multiple users using a variety of media, such as text, images, sound recordings, and/or video recordings. For example, video conferencing allows two or more individuals to communicate with each other using a combination of software applications, telecommunications devices, and a telecommunications network. Telecommunications devices may also record video streams to transmit as messages across a telecommunications network.

Currently, facial processing techniques used for communication or identification purposes are often guided by user selection. Facial recognition techniques generally train models on individual features, such that training of a first model for a first feature appearing on a face is conducted separately from training of a second model for a second feature on the face. When modeling or performing recognition functions on a new face, the separately trained models are generally used independently in some succession to construct the model or recognition of the new face.

BRIEF DESCRIPTION OF THE DRAWINGS

Various ones of the appended drawings merely illustrate example embodiments of the present disclosure and should not be considered as limiting its scope.

Figure 1:
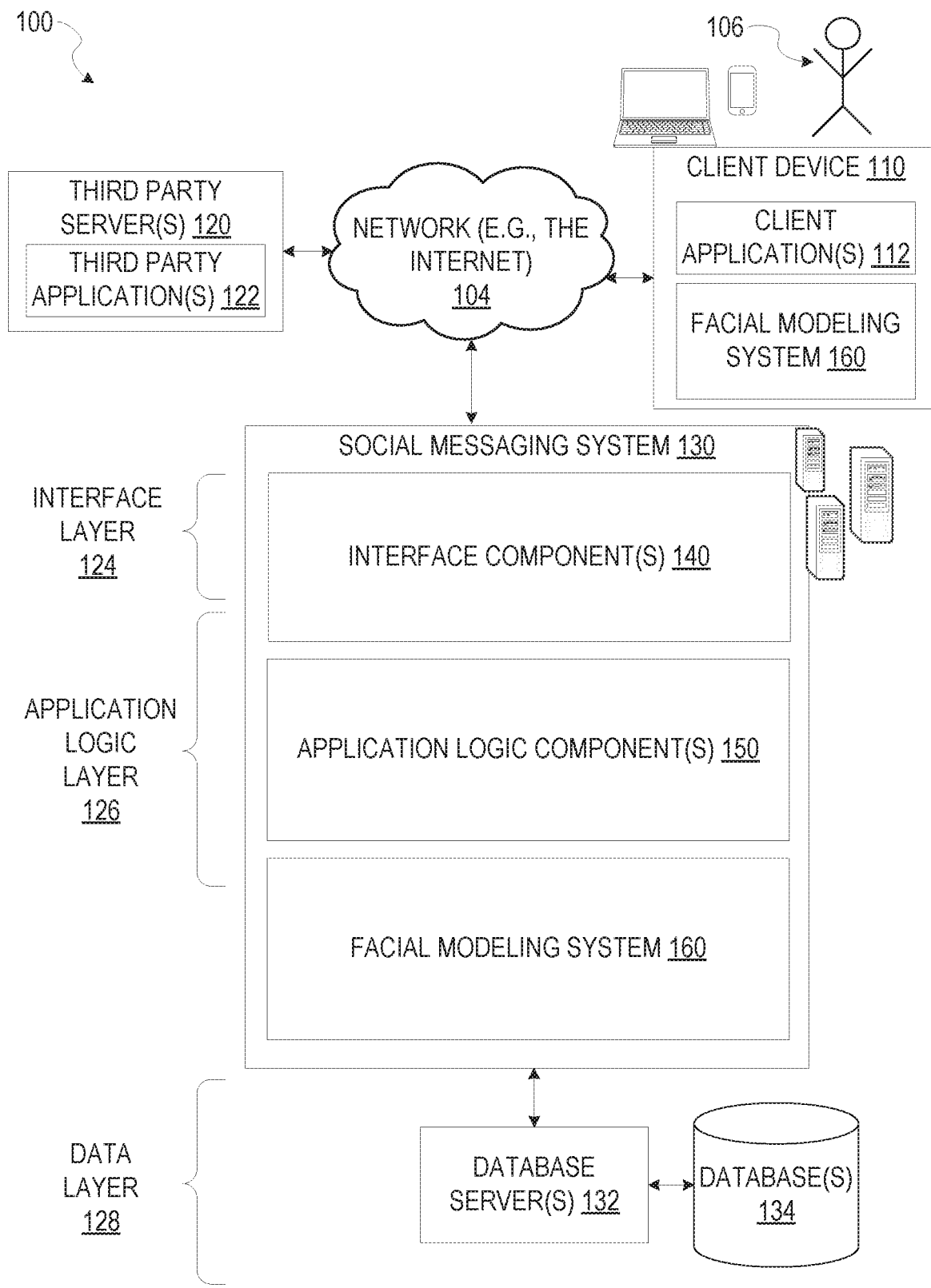
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Although methods exist to model faces and facial features within an image, these existing methods do not model visual representations using a neural model. Further, these methods do not simultaneously model, fit, or recognize a plurality of facial features or characteristics using a unified model. Existing methods often train each feature or aspect independently or using a distinct and separate task as a regularizer. The unified model may be based on a unified function having objective functions which are simultaneously trained and modified (e.g., theoretically optimized) to interpret aspects of a face based on low level curvature and other visual representations using a neural model. The unified model trains all of the facial attributes on a face simultaneously with a unified deep neural networking model. The unified model may enable a shared representation for multiple attribute recognition tasks. Accordingly, there is still a need in the art to improve identification, modeling, interpreting, and recognition of faces within images without user interaction or with minimal user interaction. Further, there is still a need in the art to improve generation of facial models and recognition of interpreted or inferred aspects relating to a face which are not characteristics identified directly on the face. As described herein, methods and systems are presented for modeling faces and identifying characteristics or interpreted aspects of a face based on facial landmarks or features of a face depicted within an image using a single user interaction of an initial selection.

Embodiments of the present disclosure may relate generally to automated image segmentation and generation of facial representations or models based on the segmented image and neural network processing of features identified within the image. In one embodiment, a facial modeling system accesses or receives images depicting faces. The facial modeling system identifies facial features and facial landmarks depicted within the images. The facial features and facial landmarks are modeled within a single function, using fitting of each facial feature in conjunction with other facial features to draw conclusions based on previously trained facial data. The facial modeling system generates probabilities indicating information about the face within the image based on the function, and interrelation of portions of the function. In some instances, the facial modeling system incorporates normalized features from an averaged face, combined to form a single aggregate face, and identifying information including demographic information.

The above is one specific example. The various embodiments of the present disclosure relate to devices and instructions by one or more processors of a device to model and draw automated inferences for a face within an image or a video stream transmitted by the device to another device while the video stream is being captured (e.g., modifying a video stream in real time). A facial modeling system is described that identifies and generates inferences for objects and areas of interest within an image or across a video stream and through a set of images comprising the video stream. In various example embodiments, the facial modeling system identifies and tracks one or more facial features depicted in a video stream or within an image and performs image recognition, facial recognition, and facial processing functions with respect to the one or more facial features and interrelations between two or more facial features.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although the network system 100 is illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client devices 110 executing client application(s) 112, and third party server(s) 120 executing third party application(s) 122. In response to received requests, the interface component 140 communicates appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of an facial modeling system 160 such that components of the facial modeling system 160 configure the client device 110 to perform a specific set of functions with respect to operations of the facial modeling system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the facial modeling system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts)

on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with one or more of the application logic components 150. The social messaging application provides a messaging mechanism for users of the client devices 110 to semi and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the facial modeling system 160 capable of identifying, tracking, and modifying video data during capture of the video data by the client device 110. Similarly, the client device 110 includes a portion of the facial modeling system 160, as described above. In other examples, client device 110 may include the entirety of the facial modeling system 160. In instances where the client device 110 includes a portion of (or all of) the facial modeling system 160, the client device 110 can work alone or in cooperation with the social messaging system 130 to provide the functionality of the facial modeling system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the facial modeling system 160 may identify, track, and modify an object of interest, such as pixels representing skin on a face depicted in the video clip. The device may modify the object of interest during capture of the video clip without image processing after capture of the video clip as a part of a generation of content for an ephemeral message.

Figure 2:
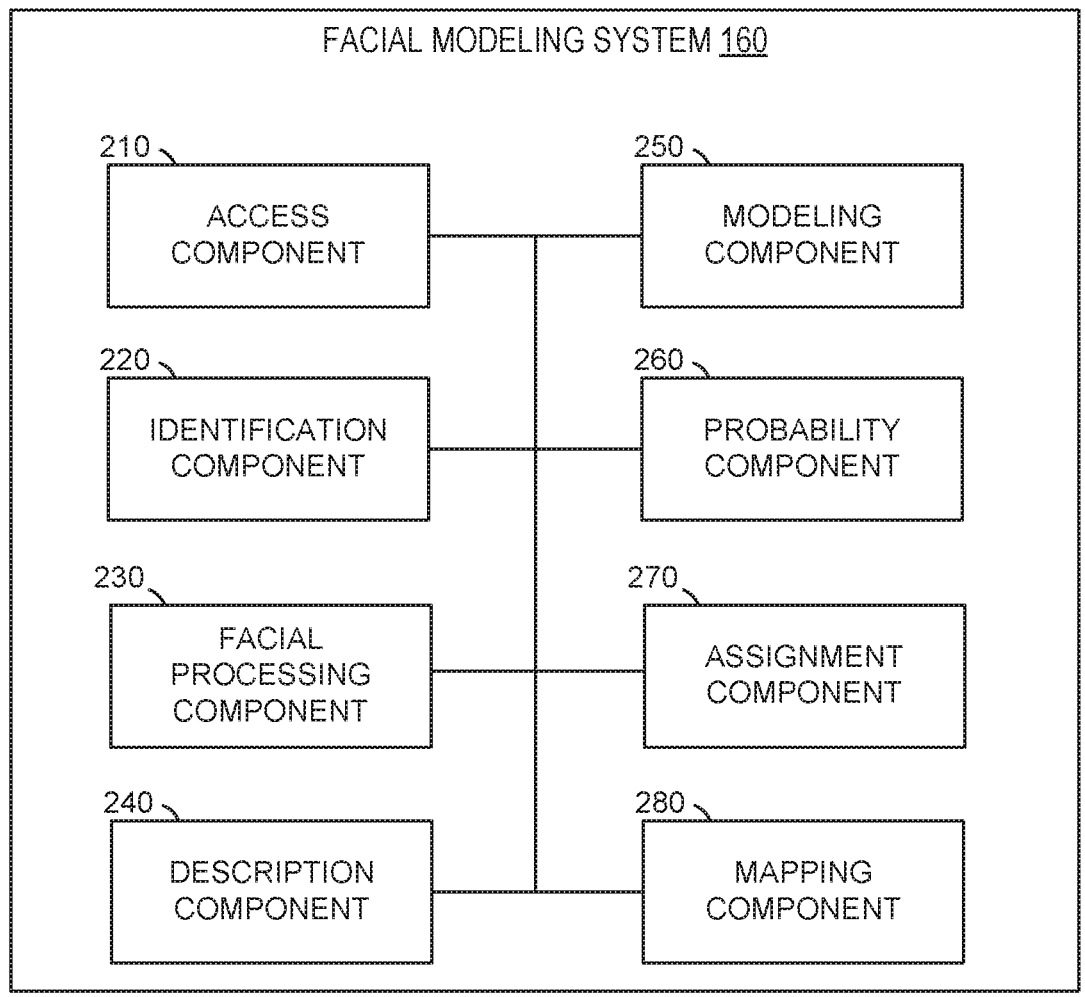
FIG. 2 is a diagram illustrating a facial modeling system, according to some example embodiments.

In FIG. 2, in various embodiments, the facial modeling system 160 can be implemented as a standalone system or implemented in conjunction with the client device 110, and is not necessarily included in the social messaging system 130. The facial modeling system 160 is shown to include an access component 210, an identification component 220, a facial processing component 230, a description component 240, a modeling component 250, a probability component 260, an assignment component 270, and a mapping component 280. All, or some, of the components 210-280 communicate with each other, for example, via a network coupling, shared memory, and the like. Each component of components 210-280 can be implemented as a single component, combined into other components, or further subdivided into multiple components. Other components not pertinent to example embodiments can also be included, but are not shown.

The access component 210 accesses or otherwise retrieves images captured by an image capture device or otherwise received by or stored in the client device 110. In some instances, the access component 210 may include portions or all of an image capture component configured to cause an image capture device of the client device 110 to capture images based on user interaction with a user interface presented on a display device of the client device 110. The access component 210 may pass images or portions of images to one or more other components of the facial modeling system 160.

The identification component 220 identifies faces or other areas of interest within the image or set of images received from the access component 210. In some embodiments, the identification component 220 tracks the identified face or areas of interest across multiple images of a set of images (e.g., a video stream). The identification component 220 may pass values (e.g., coordinates within the image or portions of the image) representing the face or areas of interest to one or more components of the facial modeling system 160.

The facial processing component 230 identifies facial features or facial landmarks depicted on the face or within the areas of interest identified by the identification component 220. In some embodiments, the facial processing component 230 identifies expected but missing facial landmarks in addition to the facial landmarks which are depicted on the face or within the area of interest. The facial processing component 230 may determine an orientation of the face based on the facial landmarks and may identify one or more relationships between the facial landmarks. The facial processing component 230 may pass values representing the facial landmarks to one or more components of the facial modeling system 160.

The description component 240 generates a descriptor function. In some instances, the descriptor function is generated with a set of object functions. The object functions may correspond to individual facial features. In some embodiments, the object functions correspond to extraction of features and classification of the extracted features. The descriptor function may be generated during a training process and may be accessed by the description component 240 during experimental use or during deployment within an application on a client device.

The modeling component 250 fits each object function of the descriptor function. The modeling component 250 may fit the object functions using stochastic gradient descent, as described below. In some embodiments, the modeling component 250 modifies parameters for each object function simultaneously. The modeling component 250 may modify parameters for the object functions with respect to, or by modifying parameters for, a regularizing function. The modeling component 250 may determine the regularizing function during the fitting process based on expected values compared to floating output of the object functions or the descriptor function.

The probability component 260 identifies identification probabilities for each facial feature. The identification probabilities may be provided by the descriptor function in response to processing an image using the descriptor function. In some instances, the identification probabilities are a value identifying a probability that a facial feature corresponds to a specified characteristic. The probability component 260 may identify numerical values associated with the identification probabilities and provide the numerical values to the assignment component 270.

The assignment component 270 assigns an identification to each facial feature on the identification probability identified for the facial feature. The assignment component 270 may assign the identification to all features based on an identification level (e.g., a broad identification such as male/female). In some embodiments, the assignment component 270 generates notifications indicating the assignment of the identification to one or more of the facial features.

The mapping component 280 maps a face received from a client device to a reference face. The mapping component 280 may map the face and reference face using facial features or landmarks of the face and reference facial landmarks of the reference face. In some embodiments, the mapping component 280 may modify the image of the face to perform the mapping, without introducing a skew or other ratio changing modification to the face. In some instances, the mapping component 280 performs the mapping by prioritizing alignment of one or more facial landmarks or by aligning a maximal number of facial landmarks.

Figure 3:
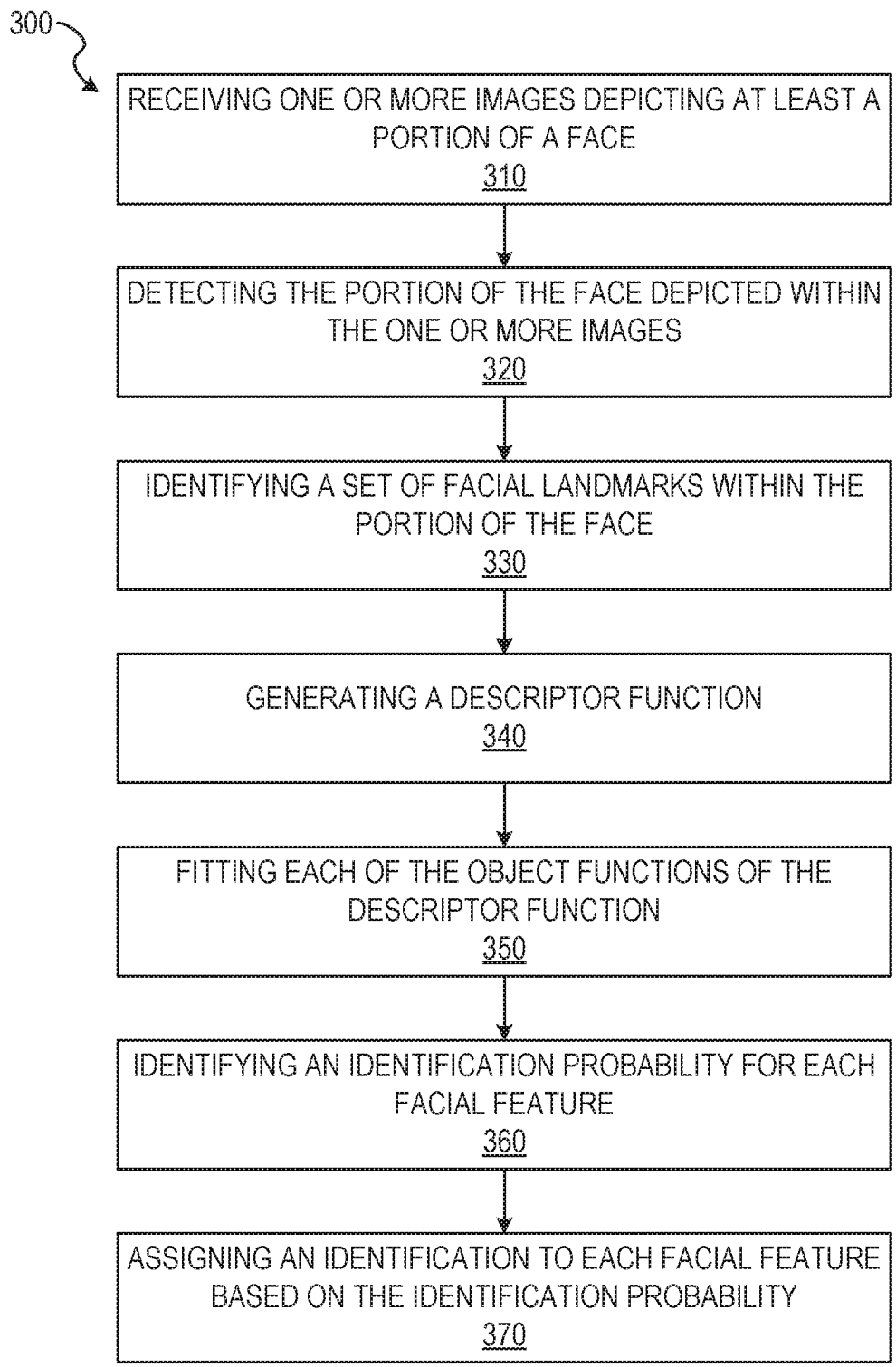
FIG. 3 is a flow diagram illustrating an example method for modeling and identifying aspects of a face from a set of images, according to some example embodiments.

FIG. 3 depicts a flow diagram illustrating an example method 300 for modeling and identifying aspects of a face from a set of images (e.g., a video stream). The operations of method 300 may be performed by components of the facial modeling system 160, and are so described below for purposes of illustration.

In operation 310, the access component 210 receives or otherwise accesses one or more images depicting at least a portion of a face. In some embodiments, the access component 210 receives the one or more images as frames of a video stream captured by an image captured device associated with the client device 110. In some instances, the video stream is presented on a user interface of the facial modeling application. The access component 210 may include the image capture device as a portion of hardware comprising the access component 210. In these embodiments, the access component 210 directly receives the one or more images or the video stream captured by the image capture device. In some instances, the access component 210 passes all or a part of the one or more images or the video stream (e.g., a set of images comprising the video stream) to one or more components of the facial modeling system 160, as described below in more detail.

In operation 320, the identification component 220 detects the portion of the face depicted within the one or more images. In some embodiments, the identification component 220 includes a set of face tracking operations to identify a face or a portion of a face within the one or more images. The identification component 220 may use the Viola-Jones object detection framework, eigen-face technique, a genetic algorithm for face detection, edge detection methods, or any other suitable object-class detection method or set of operations to identify the face or portion of the face within the one or more images. Where the one or more images are a plurality of images (e.g., a set of images in a video stream) the face tracking operations of the identification component 220, after identifying the face or portion of the face in an initial image, may identify changes in position of the face across multiple images of the plurality of images, thereby tracking movement of the face within the plurality of images. Although specific techniques are described, it should be understood that the identification component 220 may use any suitable technique or set of operations to identify the face or portion of the face within the one or more images without departing from the scope of the present disclosure.

In operation 330, the facial processing component 230 identifies a set of facial features within the portion of the face depicted within the one or more images. The facial features may correspond to one or more facial landmarks identified by the facial modeling system 160. The facial features may be identified in response to detecting a face of one or more faces. In some embodiments, the facial processing component 230 identifies the set of facial features within the portion of the face in a subset of the one or more images. For example, the facial processing component 230 may identify the set of facial features in a set of images (e.g., a first set of images) of a plurality of images, where the portion of the face or the facial landmarks appear in the set of images but not in the remaining images of the plurality of images (e.g., a second set of images). In some embodiments, identification of the facial features or facial landmarks may be performed as a sub-operation or part of identification of the face or portion of the face using face tracking operations incorporating the detection operations described above.

In operation 340, the description component 240 generates a descriptor function. The descriptor function may be generated based on the identified set of facial features described with respect to operation 330. In some example embodiments, the descriptor function represents the set of facial features and includes a set of objective functions. Each objective function represents a facial feature, an identifying characteristic, a set of identifying characteristics, a classification characteristic, a class, or any other suitable aspect capable of identifying, characterizing, or classifying a face. The descriptor function and the set of object functions may represent a neural network model as a deep neural network structure. The neural network structure may include a varying number of layers (e.g., object functions). The number and type of layers (e.g., object functions) may vary based on the number and type of information to be interpreted or otherwise identified for the face. In some embodiments, the layers include one or more convolution layers, one or more pooling layers, and one or more fully-connected layers.

In operation 350, the modeling component 250 fits each of the objective functions of the set of objective functions. In some embodiments, the objective functions are fit in response to generating the descriptor function. The objective functions may be fit simultaneously and with respect to one another, such that modification of one objective function of the set of objective functions causes a responsive modification of another objective function. For example, where a first objective function identifies a race of the face in the one or more images, a second objective function identifies a gender of the face, and a third objective function identifies an age of the face, the first, second, and third objective functions may build on or inform one another. The first objective function identifying race may correspond to specified predetermined parameters for features identified on the face. For example, the first objective function identifying one or more race may identify a set of low-level curvature or other visual representations associated with wrinkle patterns associated with certain ages or dimorphic sex characteristics associated with the gender of the face. In some instances, the modeling component 250 fits the objective functions in a cascade, with each fit objective function causing modification to parameters for one or more of the subsequent objective functions within the descriptor function.

In some embodiments, the objective functions correspond to low level patterns or curvatures in a face without specifically corresponding to a specific feature or identifying characteristic of the face. In these instances, the modeling component 250 may simultaneously fit each of the objective functions such that determining a fit for each objective function produces a set of probabilities for a predetermined set of features or identifying characteristics as an output of the descriptor function.

In operation 360, the probability component 260 identifies an identification probability for each facial feature. The identification probability may be a value identifying a probability that the facial feature corresponds to a specified characteristic. In some embodiments, objective functions correspond to one or more of the identification probabilities for facial features. In some embodiments, the identification probability is a bounded probability, such that the identification probability is contained within expected maximum and minimum boundaries. Within these maximum and minimum boundaries may be two or more feature values corresponding to identified features, characteristics, demographic, or other identifying aspects of a face. For example, feature values may correspond to age ranges, one or more races, one or more biological sex, or any other suitable identifying aspects of a face. Where the identification probability is bounded between two feature values, such as values corresponding to a male gender and a female gender, the probability component 260 may identify a numerical value falling at or between a first numerical value associated with a male gender and a second numerical value associated with a female gender. A proximity of the identification probability value to one of the first numerical value or the second numerical value indicates a probability of the facial feature corresponding to the male gender or the female gender, respectively.

In operation 370, the assignment component 270 assigns an identification to each facial feature based on the identification probability identified for each facial feature. In some embodiments, the assignment component 270 assigns the identification to all of the facial features for which the identification probability has been identified. For example, where the face is determined to be a male gendered face, the assignment component 270 may assign each of the facial features identified on the face to a male gender. When the assignment component 270 assigns identifications, such as a gender, to facial features in a set of training data and the assigned identification is correct, low-level curvatures or other visual representations associated with those facial features are identified as corresponding to the assigned gender and may be used to inform probability calculations for gender in subsequent data sets.

Where the assignment component 270 assigns identifications to facial features in a set of experimental or user provided data, the assignment component 270 may generate a notification of the identifications and cause presentation of the notification on a display device of the client device. For example, where a user of the client device causes capture or access of an image of the user's face, the facial modeling system 160, including the assignment component 270, may determine identifying information about the user such as age ranges, racial identities, gender identification, and other identifying data. The assignment component 270 may generate a graphical interface element such as a table, a list, or other graphical representation of one or more of the age, the race, the gender, and other identifying information of the user. In some instances, the assignment component 270 includes an indication of the facial features associated with each of the identifying information elements provided in the notification. The assignment component 270 may also include probability values for each facial feature to indicate the effect of each facial feature on the determination and assignment of the identifying information.

In some embodiments, the notification is provided in the form of an automatically generated avatar. The modeling component 250 in conjunction with the assignment component 270 may identify the facial features of the face provided by the user within a gallery of modeled facial features and generate a graphical representation of the face provided by the user. The graphical representation of the face may be a cartoon or other artistic representation, an animation, or any other suitable avatar. The modeled facial features may be selected and rendered on the avatar based on a determined similarity of the modeled facial features to the facial features of the face provided by the user. In some instances, the modeled facial features include metadata. The metadata may include one or more of identification probabilities, feature values, and identifying information (e.g., demographic information matched to the modeled facial feature). In some instances, the modeling component 250 and the assignment component 270 may use the metadata to select the modeled facial features by matching the metadata to the identification probabilities or the assigned identifications determined by the probability component 260 and the assignment component 270, respectively.

Figure 4:
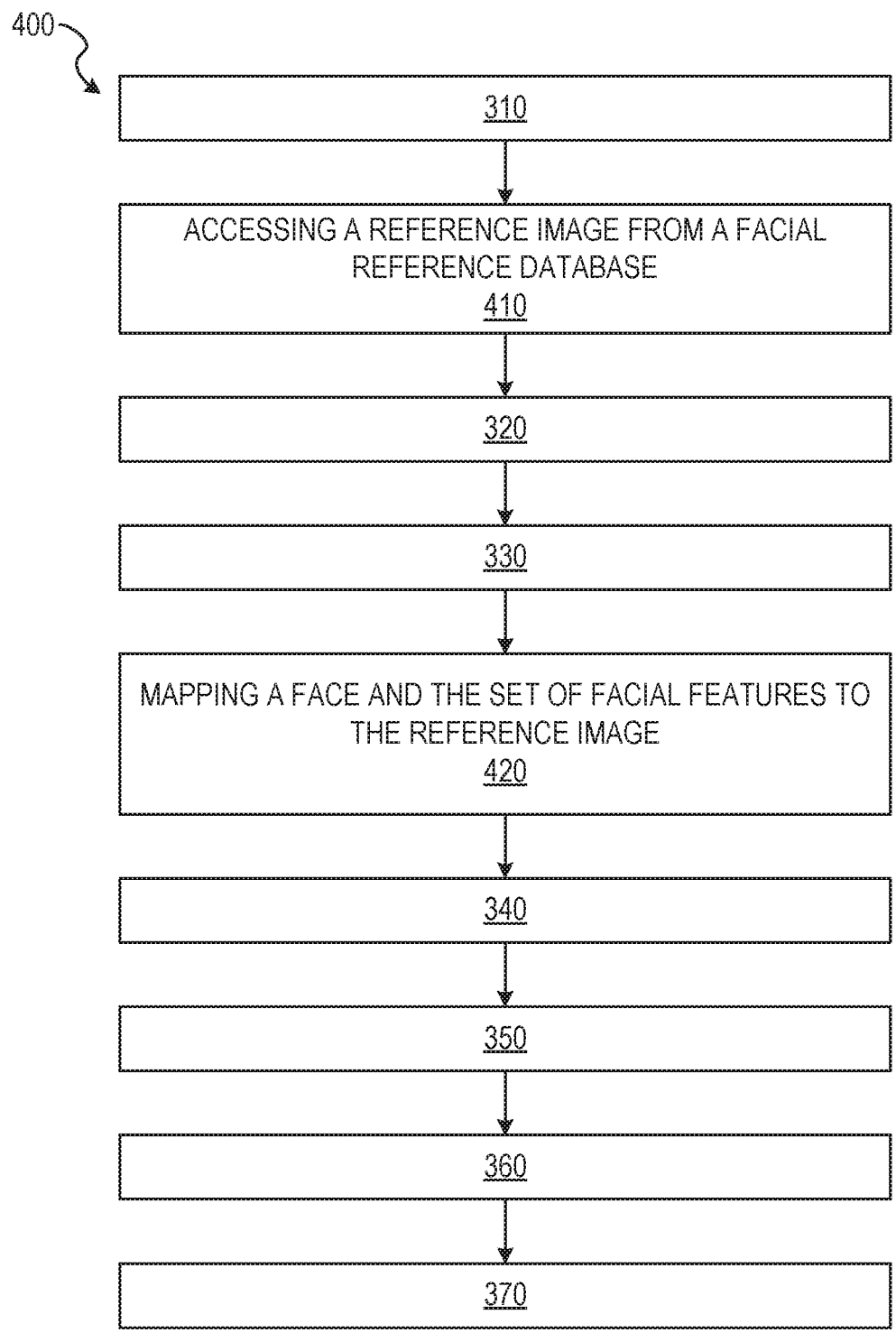
FIG. 4 is a flow diagram illustrating an example method for modeling and identifying aspects of a face from a set of images, according to some example embodiments.

FIG. 4 shows a flow diagram illustrating an example method 400 for modeling and identifying aspects of a face from a set of images. The operations of method 400 may be performed by components of the facial modeling system 160. In some instances, certain operations of the method 400 may be performed using one or more operations of the method 300 or as sub-operations of one or more operations of the method 300, as will be explained in more detail below.

In operation 410, the access component 210 accesses a reference image from a facial reference database. The reference image has a set of reference facial landmarks. In some embodiments, operation 410 is performed in response to operation 310 or as a sub-operation of operation 310. The reference image may be represented as a normalization of face size, location, and orientation within a frame of a video stream or an image. In some instances, the reference image includes a reference face or canonical face. The reference face may include an average of faces used to generate a trained model for the facial modeling system 160. In some embodiments, the reference image is a composite face representing a normalized face generated from a plurality of faces.

In operation 420, the mapping component 280 maps a face and the set of facial features to the reference image. The mapping component 280 may map the face received in the images of operation 310 to the reference face of the reference image. In some embodiments, the mapping component 280 maps the face to the reference face by aligning or substantially aligning facial features or facial landmarks, identified in operation 330, with the reference facial landmarks of the reference face. The mapping component 280 may modify a size, orientation, and location of the face to map the facial landmarks of the face to the reference facial landmarks. In some instances, the mapping component 280 modifies the size, orientation, and the location without modifying an aspect ratio or introducing a skew or other malformation into the face.

Once the mapping component 280 modifies the size, orientation, and location of the face to approximate the reference face, the mapping component 280 may align one or more of the facial landmarks of the face to the reference facial landmarks. In instances where the facial landmarks do not exactly align to the reference facial landmarks, the mapping component 280 may position the facial landmarks proximate to the reference facial landmarks. The mapping component 280 may align the face and reference face by positioning the face so that a maximal number of the facial landmarks overlap the reference facial landmarks. The mapping component 280 may also align the face and the reference face by positioning the facial landmarks to overlap the reference facial landmarks which have been identified (e.g., previously determined) to have an importance value above a predetermined importance threshold.

Figure 5:
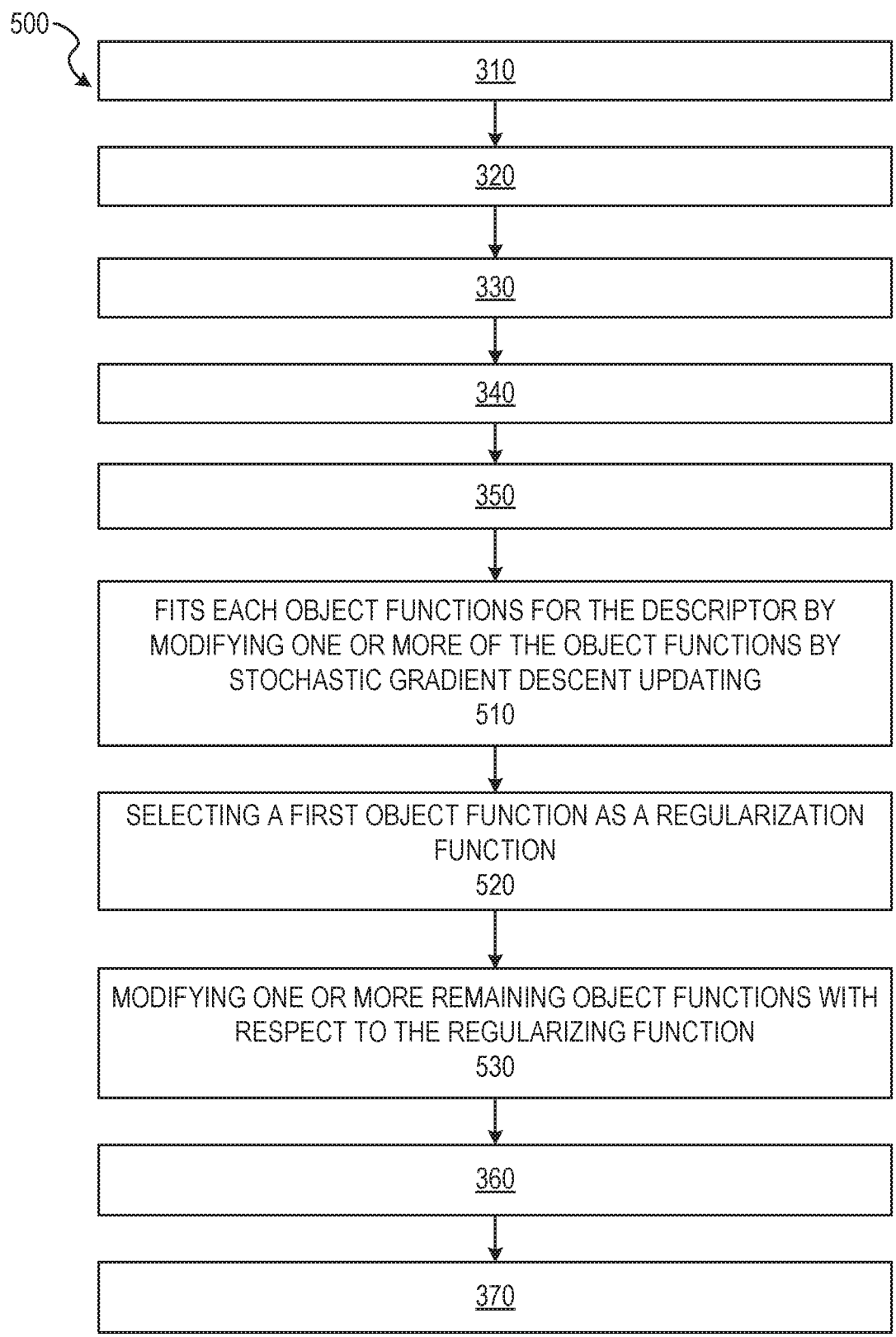
FIG. 5 is a flow diagram illustrating an example method for modeling and identifying aspects of a face from a set of images, according to some example embodiments.

FIG. 5 depicts a flow diagram illustrating an example method 500 for modeling and identifying aspects of a face from a set of images. The operations of method 500 may be performed by components of the facial modeling system 160. In some instances, certain operations of the method 500 may be performed using one or more operations of the methods 300 or 400, in one or more of the described embodiments, or as sub-operations of one or more operations of the methods 300 or 400, as will be explained in more detail below.

In operation 510, the modeling component 250 fits each of the objective functions for the descriptor function by modifying one or more of the objective functions within the descriptor function by stochastic gradient descent updating. In some embodiments stochastic gradient descent algorithm optimizes (e.g., attempts to identify a theoretical optimum value) the objective functions. The modeling component 250 employing stochastic gradient may perform gradient updating to fit the functions in a cooperative manner. Operation 510 may be performed in response to or as a sub-operation or part of operation 350, described above.

In some embodiments, the stochastic gradient descent may be performed by generating a floating output for one or more of the objective functions or the descriptor function. The modeling component 250 identifies at least one identification probability generated within the floating output. For each identification probability, the modeling component 250 determines a residue between an expected feature value and the identification probability value. For example, where the identification probability value is 0.7 and the expected feature value is 1.0, indicating a male gender, the residue is 0.3. The modeling component 250 may propagate the residue (e.g., the loss between the identified value and the expected value). The modeling component 250 may modify one or more of the objective functions or the parameters associated with the objective functions to generate an identification probability of 1.0 or closer to 1.0 than the initially provided value of 0.7. Where there is no single ground truth or expected and positively identified value, the modeling component 250 may determine the expected value based on one or more training images or the reference image.

In operation 520, the modeling component 250 selects a first objective function as a regularizing function. In some instances, the first objective function naturally serves as a regularizing function. The natural regularizing function may be associated with an identification probability which has a verifiable ground truth or expected value. For example, the regularizing function may be a gender, where the gender is known and thus the expected value for stochastic gradient descent is known. The modeling component 250 may select the first object based on a presence of a known and expected value for the identification probability. Where two or more of the objective functions are associated with a known and expected value for the identification probability, the modeling component 250 may select the objective function associated with the identification probability which provided a floating output closer to the expected value as the regularizing function.

In operation 530, the modeling component 250 modifies one or more remaining objective functions of the plurality of objective functions with respect to the regularizing function. In some embodiments, the modeling component 250 modifies the plurality of objective functions by modifying parameters associated with each function. The modeling component 250 may iteratively modify the parameters of all of the objective functions, including the regularizing function, until the regularizing function provides a value for the floating output of the identification probability which matches the expected value or is within a predetermined error threshold of the expected value.

Figure 6:
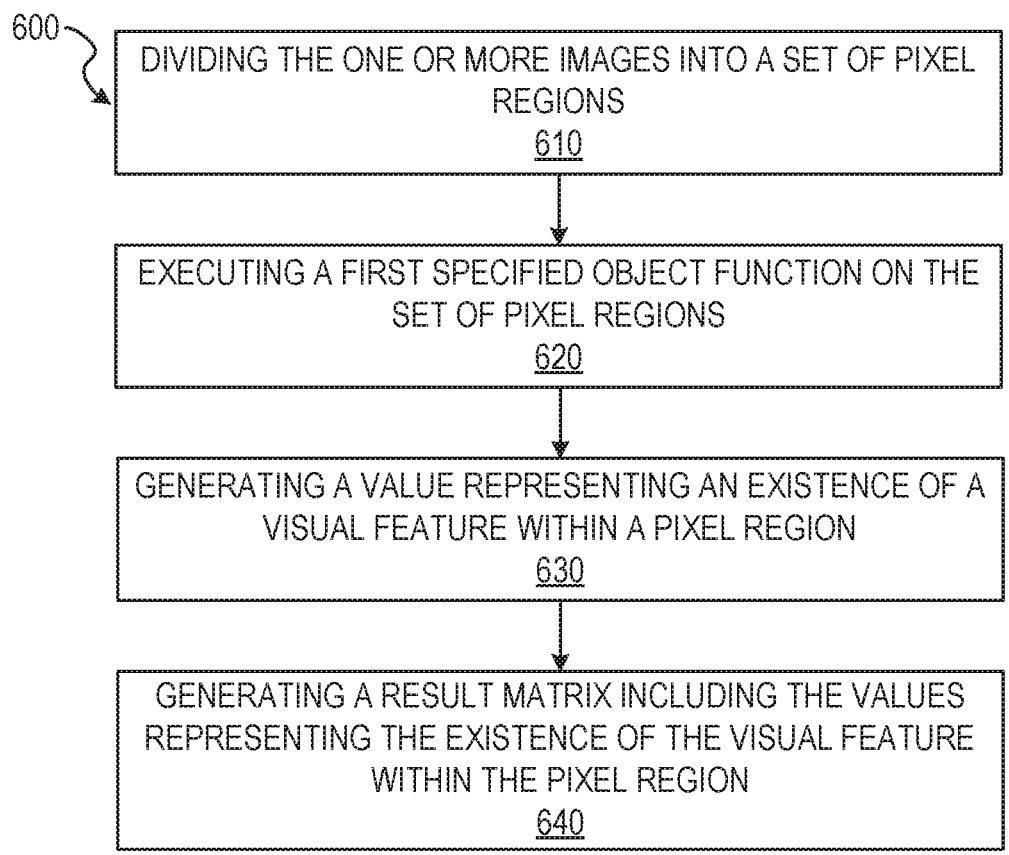
FIG. 6 is a flow diagram illustrating an example method for modeling and identifying aspects of a face from a set of images, according to some example embodiments.

FIG. 6 shows a flow diagram illustrating an example method 600 for modeling and identifying aspects of a face from a set of images. The operations of method 600 may be performed by components of the facial modeling system 160. In some instances, certain operations of the method 600 may be performed using one or more operations of the method 300, 400, or 500 or as sub-operations of one or more operations of the method 300, 400, or 500, as will be explained in more detail below.

In operation 610, the modeling component 250 divides the one or more images into a set of pixel regions. In these embodiments, the set of objective functions may include differing types of functions as part of the descriptor function. In some instances, a first specified function is a convolution layer describing at least one facial feature of the set of facial features. The one or more images may be represented as a two-dimensional matrix comprised of the set of pixel regions.

In some example embodiments, the convolution layer may serve, alone or in combination with another layer, as a feature descriptor. The feature descriptor identifies unique aspects or combinations of aspects on the face to distinguish the face from at least a portion of reference faces. In some instances, the convolution layer (e.g., the set of objective functions) may be represented using a set of matrices. The convolution layer may be represented as an equation described with respect to Equation 1, below.

$$C(x,y) = \Sigma_{m \in [0, M_a-1]} \Sigma_{n \in [0, N_a-1]} A(m,n) B(x-m, y-n) \qquad \text{Equation 1}$$

As shown in Equation 1, two matrices A and B may be presented with $M_A \times N_A$ and $M_B \times N_B$. Matrix C may be computed according to equation 1 above. Further, in equation 1, $x \in [0, M_a+M_b-1)$ and $y \in [0, N_a+N_b-1)$.

In operation 620, the modeling component 250 executes the first specified function (e.g., the convolution layer) on the set of pixel regions. In some embodiments, the modeling component 250 executes the specified function on each pixel region of the set of pixel regions. The convolution layer may operate as a filter. The modeling component 250 may process each pixel in the image or each pixel region using the filter. In some embodiments, the filter may be sized in relation to dimensions or measurements of the image. The filter may provide a single response for each location. Processing each pixel or each pixel region may be performed by identifying one or more values for the pixel or pixel region, extracting a region around the pixel or pixel region sized according to the filter, and generating a single output for the pixel or pixel region based on the values of the extracted region. The extracted region may be determined by one or more of the pixel region size or the image size. For example, where the pixel region is a single pixel, the filter size may be a multiple of the pixel region, such as a multiple of two. In this example, for each pixel, the extracted region may be a two pixel by two pixel matrix surrounding the pixel being filtered.

In operation 630, the modeling component 250 generates a value representing an existence of a visual feature within a pixel region. In some embodiments, the modeling component 250 generates a value for each pixel region of the set of pixel regions. The modeling component 250 may generate the values for pixel regions in response to performing the first specified function on each pixel region. The value for the pixel region may represent the existence of the visual feature where the determined value for the pixel region exceeds a predetermined threshold.

In operation 640, the modeling component 250 generates a result matrix including the values representing the existence of the visual feature within the pixel region. The result matrix may be a representation of the image after processing by the first function. For example, the image may be divided into pixel regions and the value for each pixel region resulting from processing by the first object function may be the value of the pixel region in the result matrix.

Figure 7:
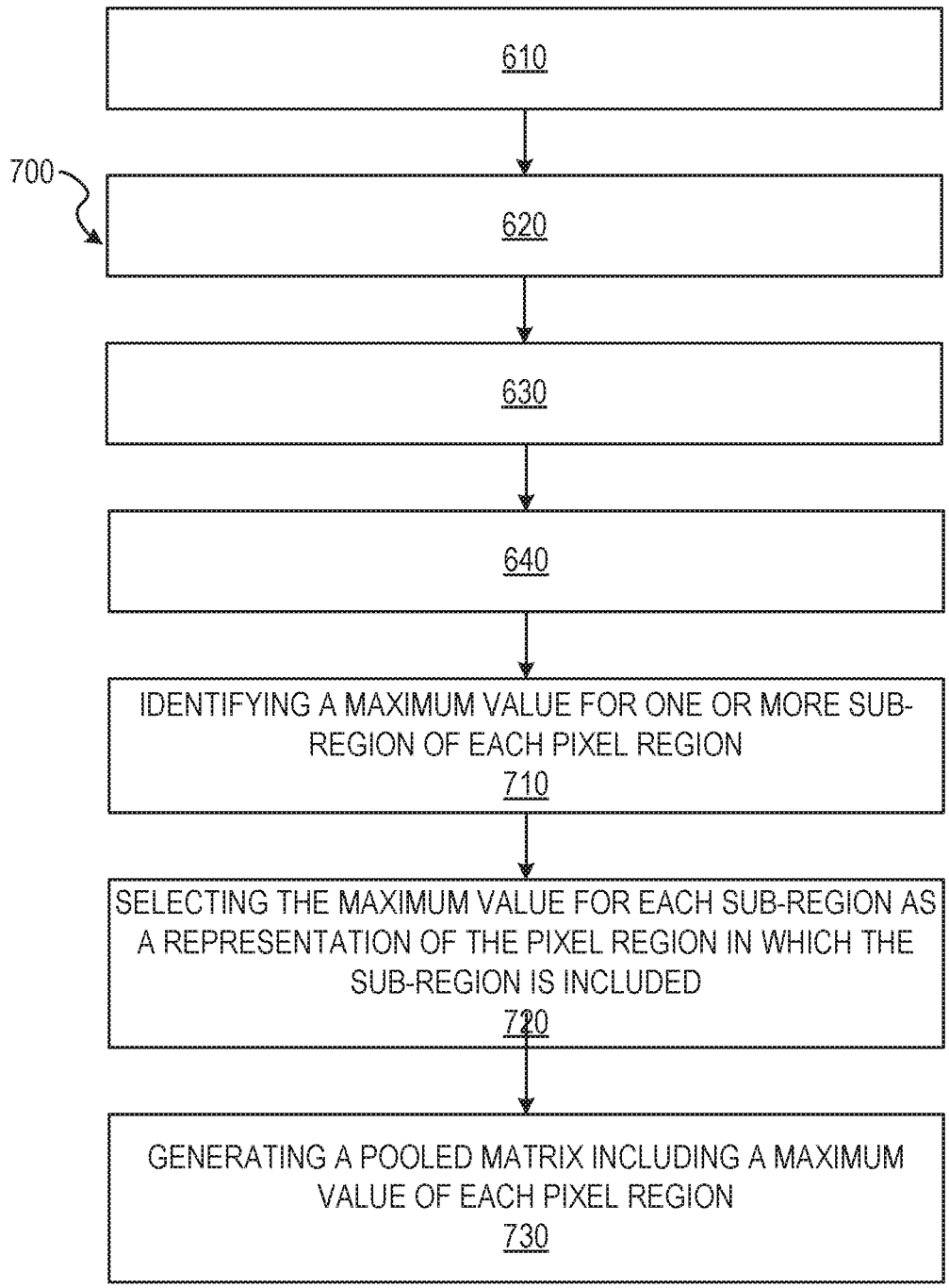
FIG. 7 is a flow diagram illustrating an example method for modeling and identifying aspects of a face from a set of images, according to some example embodiments.

FIG. 7 shows a flow diagram illustrating an example method 700 for modeling and identifying aspects of a face from a set of images. The operations of method 700 may be performed by components of the facial modeling system 160. In some instances, certain operations of the method 700 may be performed using one or more operations of the method 300, 400, 500, or 600 or as sub-operations of one or more operations of the method 300, 400, 500, or 600, as will be explained in more detail below.

In operation 710, the modeling component 250 identifies a maximum value for one or more sub-region of each pixel region. In some embodiments, operation 710 may be performed in response to one or more of the modeling component 250 dividing the one or more images into the set of pixel regions, as in operation 610, and generating the result matrix, as in operation 640. Where the modeling component 250 has generated the result matrix, the modeling component 250 may identify the maximum value for the sub-regions of each pixel region by executing a second specified function. The second specified function may be a pooling layer configured to reduce a size of the result matrix. In some embodiments, the pooling layer functions, alone or in combination with other layers, as a feature descriptor. The pooling layer may reduce a size of output of another layer (e.g., the convolution layer). In some embodiments, the pooling layer includes a max-pooling layer and an average-pooling layer. For example, the initial pooling layer may contain four-by-four elements in an element matrix. Where the pool layer applies the max-pooling layer function, the pooling layer generates a subset matrix. For example, the pooling layer may reduce the four-by-four element matrix by generating a two-by-two matrix. In some embodiments, the pooling layer outputs a representative value for each set of elements within the four-by-four matrix (e.g., four sets of elements).

In operation 720, the modeling component 250 selects the maximum value for each sub-region as a representation of the pixel region in which the sub-region is included in the result matrix. For example, the pixel region may be divided into four separate elements of the result matrix, each having a different value. The modeling component 250 selects the value for the element within the pixel region that is greater than the remaining values for four separate elements.

In operation 730, the modeling component 250 generates a pooled matrix including a maximum value of each pixel region. The pooled matrix may represent a reduction of the size of the result matrix. For example, where the result matrix includes a set of two elements by two elements for each pixel region and the result matrix includes four total pixel regions, the pooled matrix may be a two-by-two element matrix, reducing the overall size of the result matrix.

Figure 8:
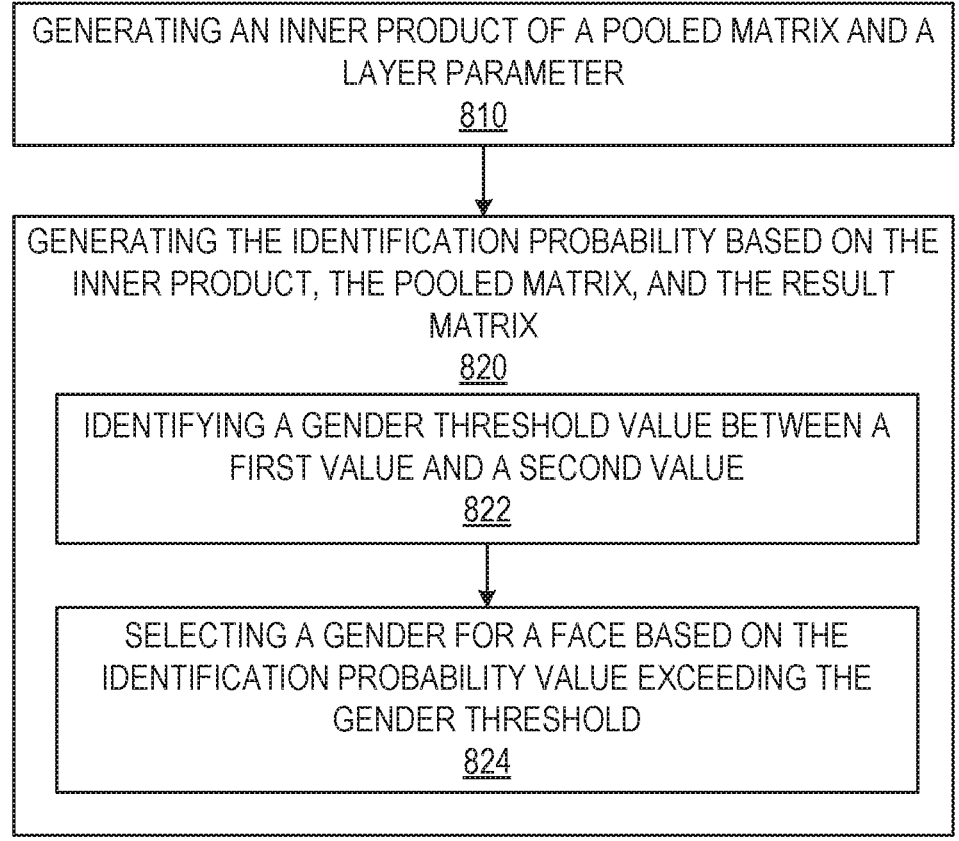
FIG. 8 is a flow diagram illustrating an example method for modeling and identifying aspects of a face from a set of images, according to some example embodiments.

FIG. 8 shows a flow diagram illustrating an example method 800 for modeling and identifying aspects of a face from a set of images. The operations of method 800 may be performed by components of the facial modeling system 160. In some instances, certain operations of the method 800 may be performed using one or more operations of the method 300, 400, 500, 600, or 700 or as sub-operations of one or more operations of the method 300, 400, 500, 600, or 700, as will be explained in more detail below.

In operation 810, the modeling component 250 generates an inner product of the pooled matrix and a layer parameter. The inner product may be generated by a fully-connected layer. The fully-connected layer may represent that each node in a layer connects to all the nodes from previous layers. For example, the specified region or element within the fully-connected layer may include the connections between the pooled matrix and the layer parameter. The output of the fully-connected layer, in some embodiments, may be an inner product of a previous layer's output.

In some embodiments, the fully-connected layer may operate as a classifier to generalize common patterns from a large set of images. For example, when given an image and a label of male and female, the fully-connected layer may be trained, modifying parameter values for each object function of the descriptor function, to correctly identify the label when processing the image using the descriptor function. In these instances, the convolution layer and the pooling layer may identify and extract facial features and provide feature vectors. The fully-connected layer may classify the image according to one or more generated identification probabilities.

In operation 820, the modeling component 250 generates the identification probability based on the inner product, the pooled matrix, and the result matrix. In some embodiments, the identification probability is a probability value bounded between a first value and a second value. The first value and the second value may represent binary options represented by the probability value. The identification probability value may fall between the first value and the second value may indicate a likelihood that a feature or aspect of the face corresponds to a first characteristic represented by the first value or a second characteristic represented by the second value. In some instances, the first value and the second value may represent bounding values with one or more additional values positioned between the first value and the second value. In these instances, the identification probability value, falling between the first value and the second value, may represent a likelihood that a feature or aspect of the face corresponds to a characteristic represented by one of the values of the group consisting of the first value, the one or more additional values, and the second value.

In some instances, the facial modeling system 160 identifies a gender feature corresponding to the first value and the second value. In some embodiments, the modeling component 250 performs operation 822, identifying a gender threshold value between the first value and the second value. The gender threshold may be positioned equidistant from the first and second values. In some instances, the gender threshold mar be positioned closer to one of the first value or the second value, based on modification of the descriptor function and object functions described above with respect to the method 500.

In operation 824, the modeling component 250, alone or in combination with the assignment component 270, selects a gender for a face based on the identification probability value exceeding the gender threshold in a direction of one of the first value or the second value. Once the modeling component 250 or the assignment component 270 selects the gender, the assignment component 270 may generate the notification described with respect to operation 370, described above Modules, Components, and Logic Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 9:
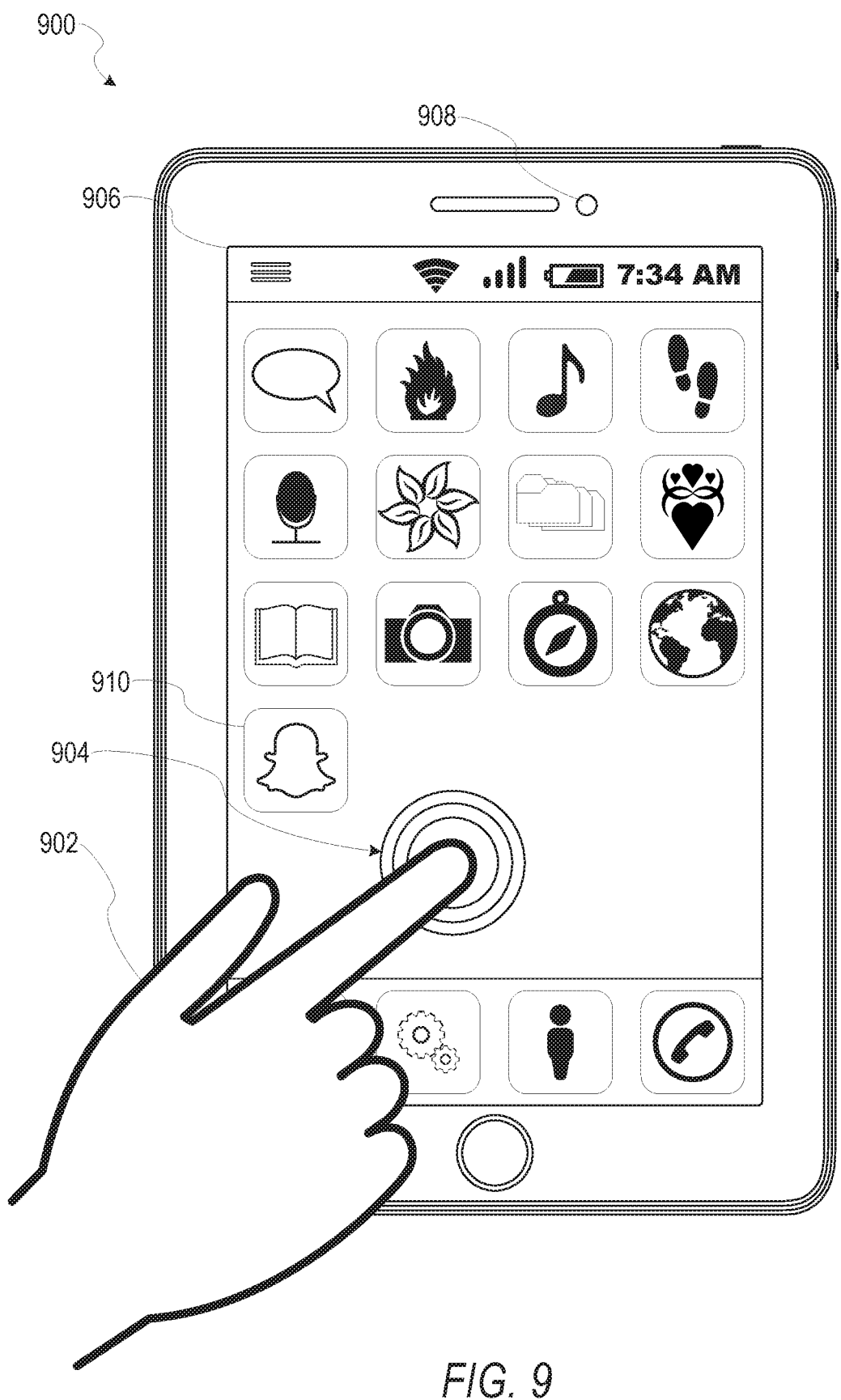
FIG. 9 is a user interface diagram depicting an example mobile device and mobile operating system interface, according to some example embodiments.

FIG. 9 illustrates an example mobile device 900 executing a mobile operating system (e.g., IOS™, ANDROID™, WINDOWS® Phone, or other mobile operating systems), consistent with some embodiments. In one embodiment, the mobile device 900 includes a touch screen operable to receive tactile data from a user 902. For instance, the user 902 may physically touch 904 the mobile device 900, and in response to the touch 904, the mobile device 900 may determine tactile data such as touch location, touch force, or gesture motion. In various example embodiments, the mobile device 900 displays a home screen 906 (e.g., Springboard on IOS™) operable to launch applications or otherwise manage various aspects of the mobile device 900. In some example embodiments, the home screen 906 provides status information such as battery life, connectivity, or other hardware statuses. The user 902 can activate user interface elements by touching an area occupied by a respective user interface element. In this manner, the user 902 interacts with the applications of the mobile device 900. For example, touching the area occupied by a particular icon included in the home screen 906 causes launching of an application corresponding to the particular icon.

The mobile device 900, as shown in FIG. 9, includes an imaging device 908. The imaging device 908 may be a camera or any other device coupled to the mobile device 900 capable of capturing a video stream or one or more successive images. The imaging device 908 may be triggered by the facial modeling system 160 or a selectable user interface element to initiate capture of a video stream or succession of images and pass the video stream or succession of images to the facial modeling system 160 for processing according to the one or more methods described in the present disclosure.

Many varieties of applications (also referred to as "apps") can be executing on the mobile device 900, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 900 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 900 includes a social messaging app 910 such as SNAPCHAT® that, consistent with some embodiments, allows users to exchange ephemeral messages that include media content. In this example, the social messaging app 910 can incorporate aspects of embodiments described herein. For example, in some embodiments the social messaging application 910 includes an ephemeral gallery of media created by users the social messaging application 910. These galleries may consist of videos or pictures posted by a user and made viewable by contacts (e.g., "friends") of the user. Alternatively, public galleries may be created by administrators of the social messaging application 910 consisting of media from any users of the application (and accessible by all users). In yet another embodiment, the social messaging application 910 may include a "magazine" feature which consists of articles and other content generated by publishers on the social messaging application's platform and accessible by any users. Any of these environments or platforms may be used to implement concepts of the embodiments of the present disclosure.

In some embodiments, an ephemeral message system may include messages having ephemeral video clips or images which are deleted following a deletion trigger event such as a viewing time or viewing completion. In such embodiments, a device implementing the facial modeling system 160 may identify, track, extract, and generate representations of a face within the ephemeral video clip, as the ephemeral video clip is being captured by the device 900, and transmit the ephemeral video clip to another device using the ephemeral message system.

Software Architecture

Figure 10:
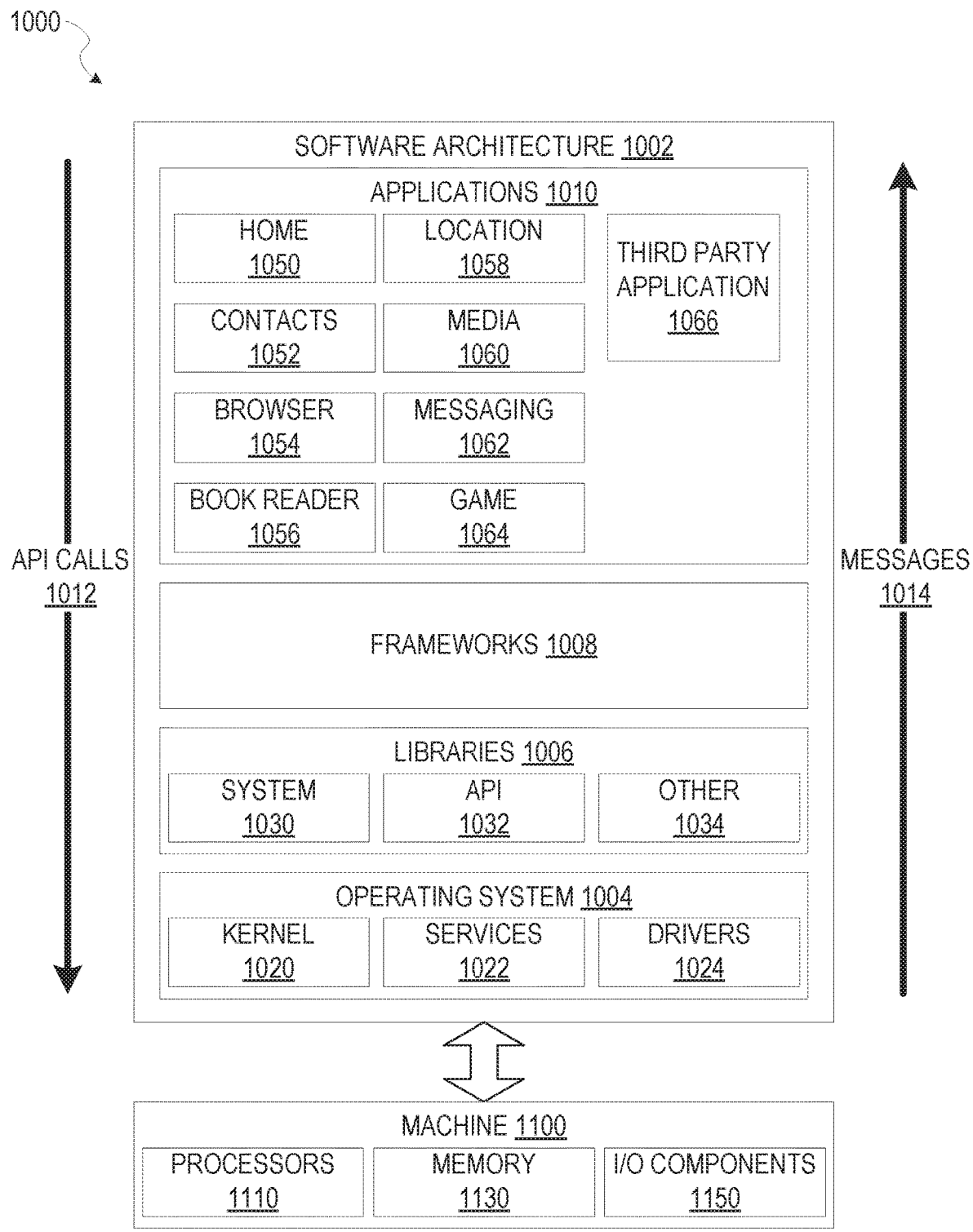
FIG. 10 is a block diagram illustrating an example of a software architecture that may be installed on a machine, according to some example embodiments.

FIG. 10 is a block diagram 1000 illustrating an architecture of software 1002, which can be installed on the devices described above. FIG. 10 is merely a non-limiting example of a software architecture, and it will be appreciated that many other architectures can be implemented to facilitate the functionality described herein. In various embodiments, the software 1002 is implemented by hardware such as machine 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third-party application 1066 can invoke the API calls 1012 provided by the operating system 1004 to facilitate functionality described herein.

Example Machine Architecture and Machine-Readable Medium

Figure 11:
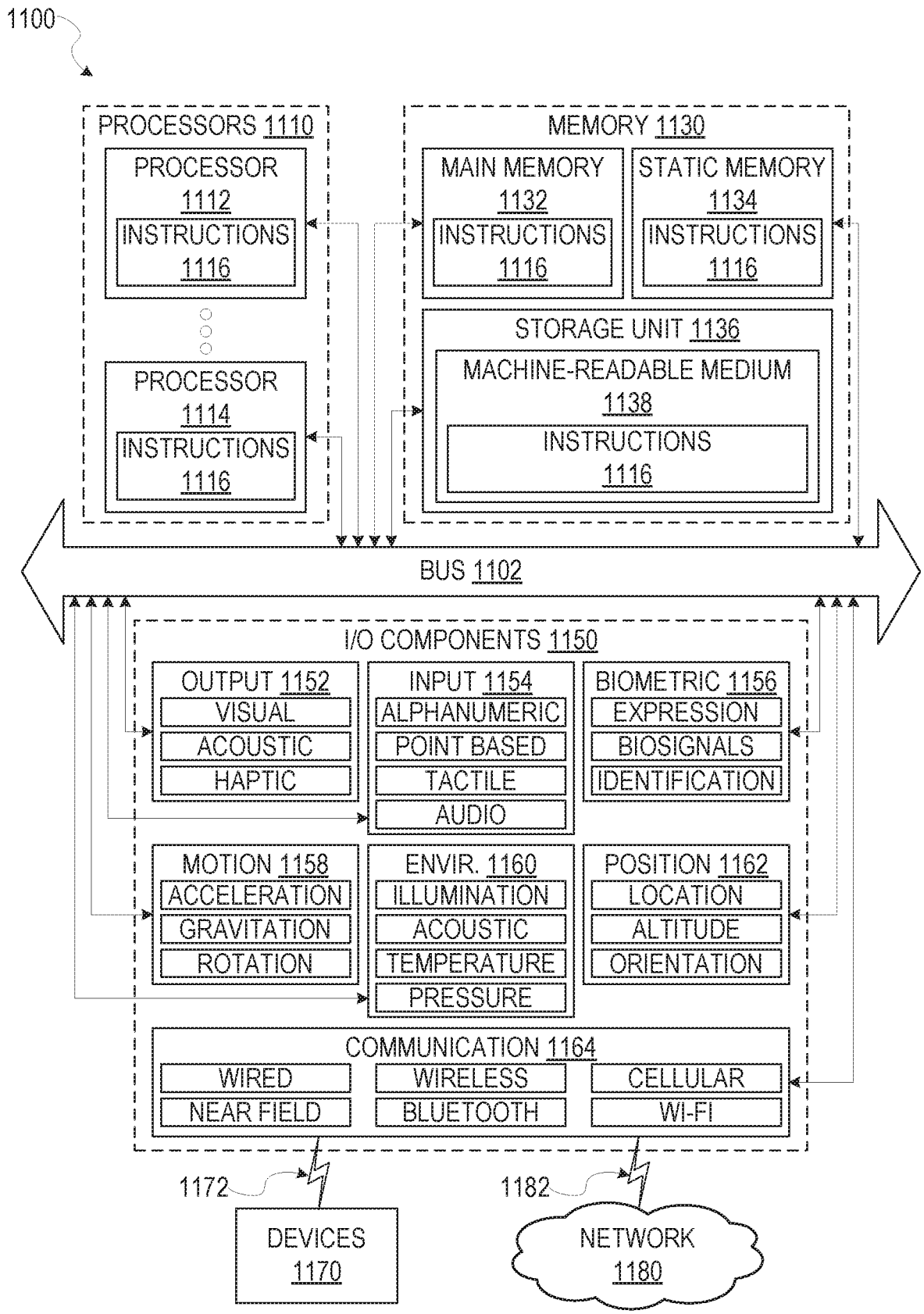
FIG. 11 is a block diagram presenting a diagrammatic representation of a machine in the form of a computer system within which a set of instructions may be executed for causing the machine to perform any of the methodologies discussed herein, according to an example embodiment.

FIG. 11 is a block diagram illustrating components of a machine 1100, according to some embodiments, able to read instructions (e.g., processor executable instructions) from a machine-readable medium (e.g., a non-transitory machine-readable storage medium) and perform any of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by the processors of the machine 1100 (e.g., processors 1110), cause the machine 1100 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (PROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another. Additionally, since the machine-readable medium 1138 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    dividing, by one or more processors, an image into a set of pixel regions, the set comprising a plurality of pixel regions;
    executing, by the one or more processors, a first object function on the set of pixel regions;
    generating, by the one or more processors, a value representing existence of a visual feature within a pixel region in the set of pixel regions, the value being generated as a result of executing the first object function on the set of pixel regions, the value also being generated based on a specified measure of closeness of the visual feature to one of first and second values of a probability boundary corresponding to two or more feature values corresponding to aspects of a given object depicted in the image; and
    generating, by the one or more processors, a result matrix including the value representing the existence of the visual feature within the pixel region.

2. The method of claim 1, wherein executing the first object function comprises:
    identifying an object feature in a portion of the set of pixel regions; and
    selecting the first object function from a plurality of object functions based on the object feature, wherein each of the plurality of object functions corresponds to different object features.

3. The method of claim 1 further comprising:
    identifying a feature of the object depicted within the image; and
    retrieving the probability boundary that includes minimum and maximum boundary values corresponding to the first and second values.

4. The method of claim 3 further comprising:
    computing, based on the result matrix, a numerical probability for the feature of the object, depicted within the image, that indicates a probability that, the feature corresponds to a specified identifying aspect of a set of identifying aspects of the given object.

5. The method of claim 4 further comprising:
    determining whether the numerical probability of the feature of the object is closer in proximity to the first or second value of the probability boundary to indicate whether the feature corresponds to the first or second identifying aspect of the given object; and
    assigning an identification to the feature of the object, depicted within the image, based on the determination of whether the numerical probability of the feature of the object is closer in proximity to the first or second value of the probability boundary.

6. The method of claim 1 further comprising:
    accessing, by the one or more processors, a reference image from an object reference database, the reference image having a set of reference object landmarks; and
    mapping an object depicted in the image to the reference image.

7. The method of claim 1 further comprising fitting the first object function.

8. The method of claim 1 further comprising fitting a plurality of objective functions in a cascade, wherein each fit objective function of the plurality of objective functions causes modifications to parameters of one or more subject objective functions, each of the plurality of objective functions identifies different aspects of an object depicted in the image.

9. The method of claim 8, wherein a first of the plurality of objective functions identifies a race of a face in the image, wherein a second of the plurality of objective functions identifies a gender of the face in the image, wherein a third of the plurality of objective functions identifies an age of the face in the image.

10. The method of claim 1, wherein the first value represents a male gender and the second value represents a female gender, further comprising:
- identifying a gender threshold value between the first value and the second value; and
- selecting a gender based on a probability value exceeding the gender threshold in a direction of one of the first value or the second value.

11. The method of claim 9, wherein another specified object is a connected layer representing connections between the result matrix and a pooled matrix, and further comprising:
- generating an inner product of the pooled matrix and a layer parameter; and
- generating a numerical probability based on the inner product, the pooled matrix, and the result matrix.

12. The method of claim 1, wherein the object function comprises a convolution layer that operates as a filter, further comprising:
- sizing the filter in relation to a dimension or measurement of the image; and
- processing each pixel in the image using the filter, the processing comprising:
  - identifying one or more values for the pixel;
  - extracting a region around the pixel sized according to the filter; and
  - generating a single output for the pixel based on the values of the extracted region.

13. The method of claim 1, wherein the generated value represents the existence of the visual feature where a determined value for the pixel region exceeds a threshold.

14. The method of claim 1 further comprising:
- identifying a maximum value for one or more sub-regions of each pixel region in the set of pixel regions;
- selecting the maximum value for each of the one or more sub-regions as a representation of the pixel region in which the sub-region is included; and
- generating a pooled matrix including a maximum value of each pixel region in the set of pixel regions.

15. The method of claim 14, wherein the maximum value is identified by executing a second object function configured to reduce a size of the result matrix.

16. A system, comprising:
- one or more processors; and
- a processor-readable storage device coupled to the one or more processors and storing processor-executable instructions that, when executed by the one or more processors, cause the one or more processors to perform operations comprising:
  - dividing an image into a set of pixel regions, the set comprising a plurality of pixel regions;
  - executing a first object function on the set of pixel regions;
  - generating a value representing existence of a visual feature within a pixel region in the set of pixel regions, the value being generated as a result of executing the first object function on the set of pixel regions, the value also being generated based on a specified measure of closeness of the visual feature to one of first and second values of a probability boundary corresponding to two or more feature values corresponding to aspects of a given object depicted in the image; and
  - generating a result matrix including the value representing the existence of the visual feature within the pixel region.

17. The method of claim 1, wherein a specified object is a connected layer representing connections between the result matrix and a pooled matrix further comprising:
- generating an inner product of the pooled matrix and a layer parameter; and
- generating a numerical probability based on the inner product, the pooled matrix, and the result matrix.

18. The system of claim 16, wherein the operations further comprise:
- identifying a feature of the object depicted within the image; and
- retrieving the probability boundary that includes minimum and maximum boundary second values corresponding to the first and second values.

19. The system of claim 16, wherein the operations further comprise:
- computing, based on the result matrix, a numerical probability for the feature of the object, depicted within the image, that indicates a probability that the feature corresponds to a specified identifying aspect of a set of identifying aspects of a given object.

20. A processor-readable storage device storing processor-executable instructions that, when executed by a processor of a machine, cause the machine to perform operations comprising:
- dividing an image into a set of pixel regions, the set comprising a plurality of pixel regions;
- executing a first object function on the set of pixel regions;
- generating a value representing existence of a visual feature within a pixel region in the set of pixel regions, the value being generated as a result of executing the first object function on the set of pixel regions, the value also being generated based on a specified measure of closeness of the visual feature to one of first and second values of a probability boundary corresponding to two or more feature values corresponding to aspects of a given object depicted in the image; and
- generating a result matrix including the value representing the existence of the visual feature within the pixel region.

* * * * *

UNITED STATES PATENT AND TRADEMARK OFFICE
CERTIFICATE OF CORRECTION

PATENT NO. : 11,100,311 B2
APPLICATION NO. : 16/509083
DATED : August 24, 2021
INVENTOR(S) : Li et al.

Page 1 of 1

It is certified that error appears in the above-identified patent and that said Letters Patent is hereby corrected as shown below:

On the Title Page

On page 4, in Column 2, under "Other Publications", Line 13, delete "toFinal" and insert --to Final-- therefor In the Claims In Column 24, Line 32, in Claim 4, delete "that," and insert --that-- therefor In Column 26, Line 25, in Claim 18, after "boundary", delete "second"

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*